(No Model.)
T. K. & W. H. BALL.
Mechanical Power Screw for Tobacco and other Presses
No. 232,872.              Patented Oct. 5, 1880.
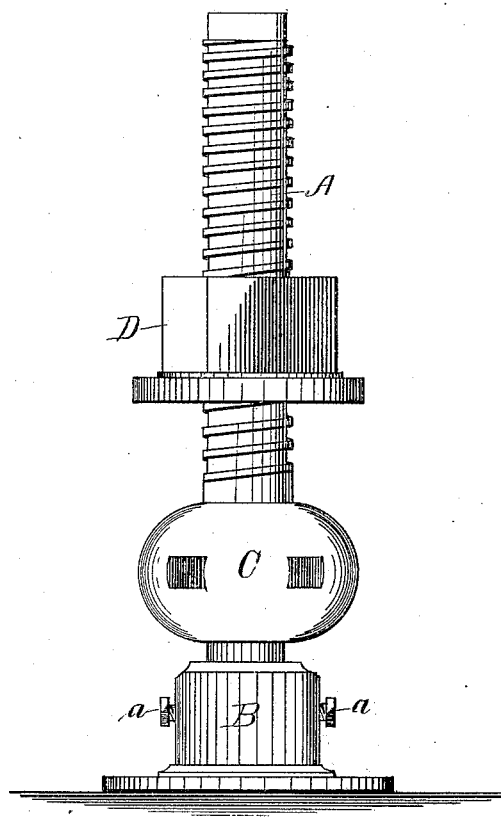
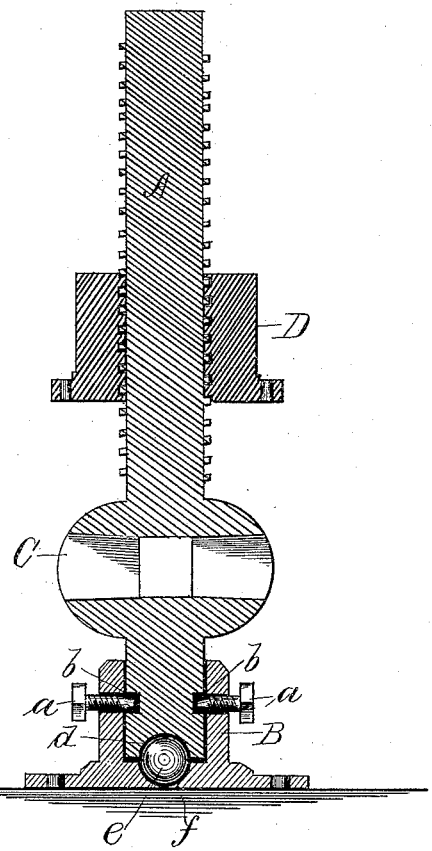
WITNESSES                                   INVENTOR

UNITED STATES PATENT OFFICE.

THOMAS K. BALL AND WILLIAM H. BALL, OF MAYSVILLE, KENTUCKY.

MECHANICAL-POWER SCREW FOR TOBACCO AND OTHER PRESSES.

SPECIFICATION forming part of Letters Patent No. 232,872, dated October 5, 1880.

Application filed August 18, 1880. (No model.)

*To all whom it may concern:*

Be it known that we, THOMAS K. BALL and WM. H. BALL, citizens of the United States, residing at Maysville, in the county of Mason and State of Kentucky, have invented certain new and useful Improvements in Mechanical-Power Screws for Tobacco and other Presses; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to an improvement in mechanical-power screws for tobacco-presses, and it is chiefly designed for compressing tobacco, cotton, and other similar products, but it may be employed with equally beneficent results for many purposes; and it consists in the vertical screw A, the holder-socket B, the windlass C, the thumb-screws $a$ $a$, in connection with the recess $b$, the adjustable impelling-screw D, and in the combination and arrangement of the parts, as hereinafter more fully described.

In the drawings, Figure 1 is an elevation thereof, and Fig. 2 is a sectional elevation.

A represents a metallic male screw, having cast solid therewith the windlass C, and provided on its periphery with the recess $b$ for reception of the ends of the thumb-screws $a$ $a$, for retaining it in the holder-socket B in an exact vertical position. It has also the concavity $d$ provided in its base, adapted to fit upon the anti-friction ball $e$, which construction and arrangement, in connection with the balancing horizontal thumb-screws $a$ $a$ operating in the recess $b$ upon its periphery, serves to prevent or modify the friction which otherwise would be produced by its revolutions in the holder-socket.

B marks a metallic holder-socket, having the horizontal female screws therein for reception of the thumb-screws $a$ $a$, and the concavity $f$, adapted as to size to suit the anti-friction ball $e$. This holder-socket is cast solid and strong, and it is provided with vertical orifices on its flange for bolting it down.

The windlass C is spherical on its horizontal periphery, where it has a number of horizontal socket-apertures for reception of bars or impelling-arms, which, as from a common center, radiate therefrom as ordinarily obtains in practice.

The adjustable or impelling-screw D is a female screw adapted to the vertical male screw A, whereon it operates, and it is provided with a horizontal flange.

By rotating the windlass the screw D may be forced upward with great power and compression, and great results, alike beneficial and useful for the intended purpose, be obtained at little cost of labor.

What we claim is—

The vertical screw A, having recess $b$, concavity $d$, and windlass C, in combination with the anti-friction roller $e$, female screw D, socket B, having concavity $f$, and thumb-screws $a$ $a$, substantially as shown, and for the purpose described.

In testimony whereof we affix our signatures in presence of two witnesses.

THOS. K. BALL.
WM. H. BALL.

Witnesses:
J. F. BARBOUR,
R. K. HOEFLICH.